United States Patent [19]

Bryan et al.

[11] Patent Number: 5,174,948
[45] Date of Patent: Dec. 29, 1992

[54] TRANSITORY FUEL ROD GUIDANCE SYSTEM

[75] Inventors: William J. Bryan, Granby, Conn.; Mark K. Davis, Springfield, Mass.

[73] Assignee: Combustion Engineering, Inc., Windsor, Conn.

[21] Appl. No.: 582,562

[22] Filed: Sep. 14, 1990

[51] Int. Cl.⁵ .......................................... G21C 19/00
[52] U.S. Cl. .................................. 376/264; 376/451; 376/409; 376/453; 376/261
[58] Field of Search ............... 376/264, 352, 260, 268, 376/261, 451, 437, 409, 453; 521/904; 294/86.32

[56] References Cited

U.S. PATENT DOCUMENTS

| | | | |
|---|---|---|---|
| 4,314,885 | 2/1982 | Edwards et al. | 376/327 |
| 4,522,780 | 6/1985 | Shallenberger et al. | 376/260 |
| 4,966,745 | 10/1990 | Widener et al. | 376/264 |
| 5,043,134 | 8/1991 | Widener et al. | 376/264 |

Primary Examiner—Donald P. Walsh
Assistant Examiner—Meena Chelliah
Attorney, Agent, or Firm—John H. Mulholland

[57] ABSTRACT

A removable and reusable cap for fuel rod ends to prevent grid damage during loading permits fuel end configurations to match utility's special tooling for fuel assembly repair and reconstitution. The elastomeric transitory fuel rod guidance ends expand over a flange and temporarily snap into place in a groove in the fuel rod end to provide a tapered guiding surface.

3 Claims, 1 Drawing Sheet

TRANSITORY FUEL ROD GUIDANCE SYSTEM

BACKGROUND OF THE INVENTION

The invention relates to pressurized water nuclear reactor fuel assemblies of the type having upper and lower end fittings joined by guide tubes or thimbles upon which are mounted spaced fuel rod support grids for holding hollow clad fuel rods of nuclear fuel with solid end caps thereon.

There is a need, when assembling or reassembling fuel rods in the individual cells of the fuel assembly grids, to provide guidance as the fuel rod is inserted into and through a fuel assembly grid. Properly guided fuel rods during fuel rod loading prevent possible grid damage and fuel rod hangup.

Most producers of nuclear fuel have provided their fuel rods with end configurations which facilitate the use of gripper tools for loading and reconstitution. These configurations were designed to prevent grid damage during fuel rod insertion when used with specific grid designs. Some utilities, especially those in Europe, perform their own fuel assembly repair and reconstitution. In many cases, these utilities have purchased special tooling to perform these operations. Therefore, they do not want the fuel rod end configurations changed. In fact, some utilities have made it a requirement to maintain the same fuel end configuration for reload batches.

SUMMARY OF THE INVENTION

The invention involves a system which utilizes a cap that when attached to the end of the fuel rod, prevents grid damage during loading of the fuel rod into the fuel assembly to a position of support in the grids. The cap is attached to the leading end of the fuel rod during rod insertion but is transitory or removable such that after the fuel rod insertion into the fuel assembly it can be easily taken off the fuel rod end. Therefore, a specific end configuration which prevents grid damage can be used during loading and then removed to reveal the end configuration required by the utility.

The configurations of fuel rod end caps now in use require the device to expand over a flange than snap into a groove in the fuel rod end cap. The groove in the fuel rod end cap is used for gripping the fuel rod during insertion and/or removal from the fuel assembly. Therefore, the material used to manufacture the device must be able to expand over the flange and then contract into the groove reforming to its original shape. The material must also be hard enough to give guidance to the rod as it passes through a grid without itself being damaged. Testing was conducted on different materials. An MDI-based polyurethane elastomer was selected for use because of its superior performance in meeting these requirements.

Prior to fuel rod insertion into a fuel assembly, urethane caps are installed. The caps have been designed so that they guide the rod into and through the specific grid used in the fuel assembly and also can be installed on the specific fuel rod end cap geometry.

Installation of the caps could be performed by hand or machine and is accomplished by pressing the female end of the urethane cap on to the end cap of the fuel rod. Once installed the rods are loaded into the fuel assembly by pushing the rod, urethane capped end first. By means of its geometry, the urethane cap guides the fuel rod into and through each grid, preventing the rod from damaging the grid or hanging up on grid supports. After the rod has been loaded through all grids, the caps are removed by pulling them off. Caps are then cleaned and readied for reuse.

DETAILED DESCRIPTION OF THE ILLUSTRATED EMBODIMENT

Figure 1:
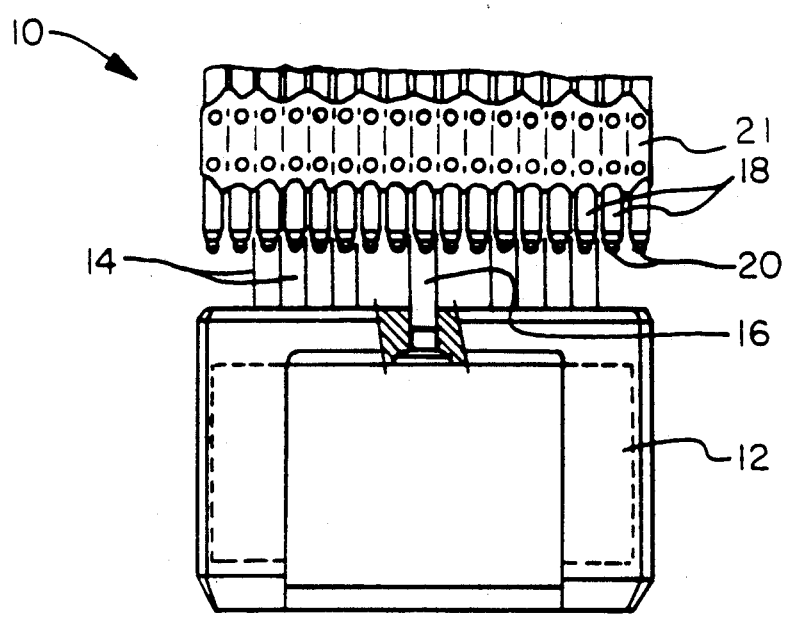
FIG. 1 is a partial elevational schematic view, with broken away portions, illustrating the lower end of a pressurized water nuclear reactor fuel assembly loaded with fuel rods with special end configurations which facilitate the use of gripper tools for loading and reconstitution.

The number 10 generally designates a pressurized water nuclear reactor fuel assembly which includes, as partially illustrated in FIG. 1, a lower end fitting 12, guide tubes 14, an instrumentation tube 16, fuel rods 18 having special end caps 20 with configurations for gripper tools and a lower grid 21 supporting said fuel rods.

Figure 2:
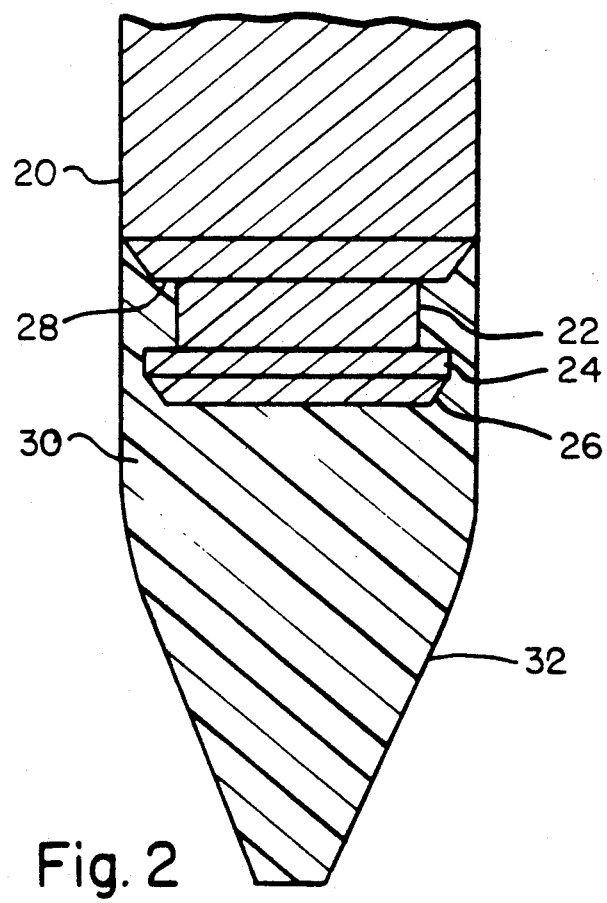
FIG. 2 is a partial elevational cross-section of the lower end of one of the fuel rods of the FIG. 1 fuel assembly with a transitory fuel rod guidance cap constructed according to principles of the invention in place for insertion of the rod into the fuel assembly.

As seen in FIG. 2, a removable and reusable end cap 30 for the fuel rod ends as configured is provided to prevent grid damage during loading. The cap 30 permits the fuel end configuration 20, with its groove 22 and enlarged head 24 with taper 26 to match the utility's special tooling for fuel assembly repair and reconstitution. This is possible because with the cap 30, gripping features of end cap 20, even the shoulder 28 on the fuel rod end are shielded from, and thus will not hang up on the grids 18 during insertion. The elastomeric transitory fuel rod guidance end or cap 30 expands over the head or flange 24 and temporarily snaps into place in the groove 22 of the fuel rod end cap 20 to provide a tapered guiding surface 32 which cams the fuel rods 18 through the grids, including grid 21.

The cap 30 is of an elastomeric material, specifically Uniroyal Vibrathane B635 cured with 95% theoretical equivalent BASF 1,4-butanediol was used. This resulted in a material which had the required elasticity to be installed on the fuel rod end cap, remain fixed on the fuel rod during fuel rod installation into the grids, and also was hard enough to give guidance to the rod during installation into and through the grids. The specific material selected yielded a Shore A 89 nominal hardness. Other materials of suitable properties may also be used.

We claim:

1. In a nuclear fuel rod having an end with gripping features for use in inserting the rod into support grids of a fuel assembly, the improvement comprising;
    transitory means for shielding said features from engagement with the support grids;
    cam means on said transitory means for guiding said rods into said grids without grid damage or rod hangup; and,
    said transitory means including mechanical attachment means to hold said transitory means in place during rod insertion into said grids and for permitting removal of said means after rod insertion into said grids.
2. The nuclear fuel rod of claim 1 in which the transitory means includes a resilient portion which frictionally engages the features.
3. The nuclear fuel rod of claim 2 in which the transitory means is a cap of elastomeric material.

* * * * *